United States Patent
Durnov et al.

(10) Patent No.: US 11,016,695 B2
(45) Date of Patent: May 25, 2021

(54) METHODS AND APPARATUS TO PERFORM MEMORY COPY OPERATIONS

(71) Applicant: Intel Corporation, Santa Clara, CA (US)

(72) Inventors: Dmitry Durnov, Nizhny Novgorod (RU); Sergey Gubanov, Nizhny Novgorod (RU); Sergey Kazakov, Satis (RU)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/345,640

(22) PCT Filed: Dec. 20, 2016

(86) PCT No.: PCT/IB2016/001977
§ 371 (c)(1),
(2) Date: Apr. 26, 2019

(87) PCT Pub. No.: WO2018/115920
PCT Pub. Date: Jun. 28, 2018

(65) Prior Publication Data
US 2019/0272104 A1    Sep. 5, 2019

(51) Int. Cl.
*G06F 3/06*        (2006.01)
*G06F 12/0888*     (2016.01)
*G06F 12/0897*     (2016.01)

(52) U.S. Cl.
CPC ............ *G06F 3/065* (2013.01); *G06F 3/0604* (2013.01); *G06F 3/0659* (2013.01);
(Continued)

(58) Field of Classification Search
CPC .............................. G06F 3/065; G06F 12/0888
See application file for complete search history.

(56) References Cited

U.S. PATENT DOCUMENTS 8,700,857 B2    4/2014  Sapronov et al.
2005/0071564 A1*  3/2005  Luick .................... G06F 12/121
                                                      711/121
(Continued)

FOREIGN PATENT DOCUMENTS

WO        2006127857        11/2006

OTHER PUBLICATIONS

J. Guo et al., "Memory System Design for a Multi-core Processor," 2008 International Conference on Complex, Intelligent and Software Intensive Systems, Barcelona, 2008, pp. 601-606.*

(Continued)

*Primary Examiner* — Pierre Miche Bataille
(74) *Attorney, Agent, or Firm* — Hanley, Flight & Zimmerman, LLC

(57) ABSTRACT

A disclosed example method to perform memory copy operations includes copying a first portion of data from a source location to a destination location, the first portion of the data being less than all of the data intended to be copied from the source location to the destination location; determining a cache miss measure indicative of an amount of the first portion of the data that is located in a cache; selecting a type of memory copy operation based on the cache miss measure; and initiating a memory copy operation based on the selected type of memory copy operation to copy a second portion of the data from the source location to the destination location.

25 Claims, 7 Drawing Sheets

(52) U.S. Cl.
CPC ........ *G06F 3/0673* (2013.01); *G06F 12/0888* (2013.01); *G06F 12/0897* (2013.01); *G06F 2212/1016* (2013.01); *G06F 2212/1021* (2013.01)

(56) References Cited

U.S. PATENT DOCUMENTS

| | | | |
|---|---|---|---|
| 2007/0150675 A1 | 6/2007 | Arimilli et al. | |
| 2008/0155679 A1* | 6/2008 | Sebot | G06F 21/74 726/16 |
| 2011/0047408 A1* | 2/2011 | Gille | G06F 12/126 714/723 |
| 2011/0307664 A1* | 12/2011 | Paver | G06F 12/121 711/128 |
| 2014/0325248 A1* | 10/2014 | Kim | G06F 13/4234 713/320 |
| 2015/0139326 A1* | 5/2015 | Lin | H04N 19/433 375/240.16 |
| 2016/0055083 A1 | 2/2016 | Rozario et al. | |
| 2016/0342518 A1* | 11/2016 | Park | G06F 12/0811 |
| 2019/0042451 A1* | 2/2019 | Leone | G06F 12/0891 |

OTHER PUBLICATIONS

"International Search Report", issued by the European Patent Office as the International Searching Authority in connection with International Application No. PCT/IB2016/001977, dated Sep. 5, 2017 (4 pages).

"Written Opinion of the International Searching Authority," issued by the European Patent Office as the International Searching Authority in connection with International Application No. PCT/IB2016/001977, dated Sep. 5, 2017 (6 pages).

Ronald W. Green, "Memory Movement and Initialization: Optimization and Control," Intel Developer Zone, Apr. 16, 2014 (4 pages).

Li Zhao et al., "Hardware Support for Accelerating Data Movement in Server Platform," IEEE Transactions on Computers, vol. 56, No. 6, Jun. 2007 (14 pages).

Anderson et al., "Performance of the Cray T3E Multiprocessor," Proceedings of the 2nd ACM Workshop on Role-Based Access Control, RBAC 1997, Fairfax, Virginia, Nov. 6-7, 1997 (17 pages).

Menon et al., "The IBM 3990 disk cache," IEEE Computer Society International Conference (COMPCON), San Francisco, Feb. 29-Mar. 4, 1988 (6 pages).

* cited by examiner

METHODS AND APPARATUS TO PERFORM MEMORY COPY OPERATIONS

FIELD OF THE DISCLOSURE

The present disclosure relates generally to processor systems and, more particularly, to methods and apparatus to perform memory copy operations.

BACKGROUND

Programs and operating systems that execute on processor systems perform many memory copy operations to copy data between different memory locations within a single memory or between different locations located in different memories of the processor systems. For example, memory copy operations can be used to copy data between different cache locations within the same cache or between different memory locations within the same memory. Memory copy operations can also be used to copy data between a cache location and a memory location of a separate memory.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
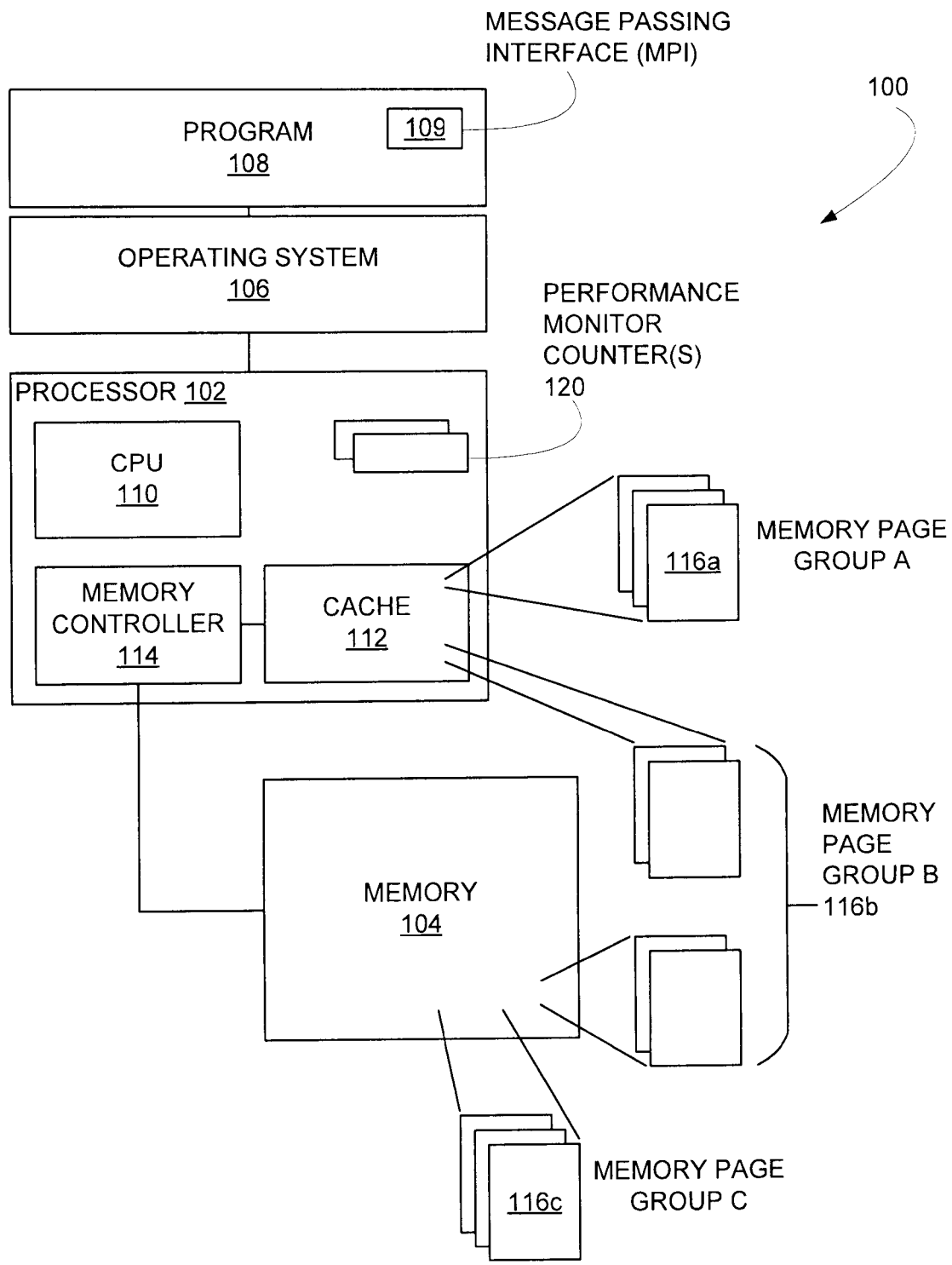
FIG. 1 depicts an example processor system that may be used to perform adaptive memory copy operations in accordance with the teachings of this disclosure.

Many computing processes of processor systems use significant amounts of memory copy operations to move or copy data between different locations of cache and/or memory. For example, some types of memory copy operations can be used to copy data from a source location in a cache of a processor to a destination location in the cache or to a destination location in a memory that is separate from the cache. Other types of memory copy operations could be used to copy data that from a source location in the memory to a destination location in the memory or to a destination location in the cache.

Programs and operating systems that execute on processor systems perform many memory copy operations to copy or move data between different memory locations. For example, a Message Passing Interface (MPI) runtime is a key component of a High Performance Computing (HPC) ecosystem. A main basic block of the MPI runtime is a data movement mechanism. From a runtime implementation perspective, there are a significant number of data movements that require data copying from one memory area to another using a memory copy routine (e.g., a memcpy operation). Prior techniques have been used to optimize the use of memcpy operations. Such techniques have been used to optimize the MPI runtime which in turn helps HPC applications gain access to the best available CPU resources. However, such prior optimizations do not ensure efficient use of cache and memory stores.

Many CPU (central processing unit) architectures have cache/memory hierarchies in which recently and/or frequently used data is temporarily stored in the cache for relatively quicker access than is achievable using memory accesses, while less recently and/or less frequently used data remains in the memory (e.g., a volatile random access memory (RAM) or non-volatile memory) which has relatively slower access times than cache. When a memory copy operation is requested, target data to be copied (e.g., specified via a source location argument of a memcpy function) may reside on any level of the cache/memory hierarchy. The target data may be stored in cache (e.g., cache data) or it may be stored in memory only (e.g., off-cache data) without being temporarily stored in cache. Using prior techniques, memory copy operations (e.g., implemented using a memcpy function) use the cache unconditionally as an intermediate write location to perform requested copy operations. For example, prior memory copy techniques copy target data between source and destination locations by intermediately writing target data into cache from a source location before writing the target data to a destination location. Such unconditional use of cache leads to slower copy times for memory copy operations that employ cache writes as an intermediate step but do not necessarily need to use the cache as an intermediate write location. For example, if target data does not reside in cache, but a prior memory copy technique employs a type of memory copy operation that unconditionally writes to cache as an intermediate step, such writing to cache introduces unnecessary delay in the memory copy operation relative to another type of memory copy operation that does not use cache as an intermediate write location. Thus, prior memory copy techniques can result in slow memory copy performance. In addition, such unconditional use of cache also results in thrashing the cache by overwriting cache data that may otherwise be used by other processes to enable quicker accesses to the data. As such, using prior techniques to perform memory copy operations that do not consider whether target data is stored in cache or memory can lead to decreasing data access performances of other running processes by overwriting cache data that is useful to those running processes. For example, when data used by another process is overwritten in cache during a memory copy operation, additional memory access cycles must be expended when servicing a subsequent request from the other process to access such data because the data must be retrieved from a memory (e.g., a volatile random access memory (RAM) or a non-volatile memory) that is relatively slower than the cache.

Examples disclosed herein enable implementing adaptive memory copy operations in a manner that uses cache in a more efficient manner by improving memory copy speed performance by not using cache as an intermediate write location when such cache writing is unnecessary. Examples disclosed herein also use cache in a more efficient manner by preserving cache data when it is not necessary to overwrite such data. For example, examples disclosed herein may be used to adaptively select different types of memory copy operations based on whether the source location of the target data to be copied is located in cache or located off cache. That is, depending on whether the target data to be copied is in cache data or off cache data, examples disclosed herein select a correspondingly suitable type of memory copy operation that uses cache as an intermediate write location as part of the copying or that does not use cache as an intermediate write location as part of the copying. Prior techniques for implementing memory copy operations do not perform such cache analysis and, thus, often overwrite useful cache data when copying data which creates inefficiencies in subsequent cache use.

Some prior art techniques for performing memory copies use the size of the target data to be copied as an indicator to estimate whether the target data is likely located in cache or located off cache. However, the size of the target data is often not a reliable indicator of on-cache or off-cache storage because data may be stored in cache regardless of data size. That is, data is typically stored in cache based on the frequency with which the data is accessed and/or based on the amount of time and/or machine cycles elapsed since the last access to that data instead of the size of the data. Unlike such prior techniques based on data size, examples disclosed herein analyze whether target data is actually stored in cache or off cache to determine whether to select a type of memory copy operation that uses the cache to copy the target data or a type of memory copy operation that does not use cache to copy the target data.

FIG. 1 depicts an example processor system 100 that may be used to perform adaptive memory copy operations in accordance with the teachings of this disclosure. The example processor system 100 includes an example processor 102 in circuit with an example memory 104. The processor 102 of the illustrated example is a hardware processor. Although only one processor is shown, examples disclosed herein may be implemented using a multi-processor system. The example memory 104 may be a volatile memory such as RAM (e.g., dynamic RAM (SDRAM), synchronous DRAM (SDRAM), double data rate SDRAM (DDR SDRAM), static RAM (SRAM), etc.) or a non-volatile memory (e.g., flash, NAND flash, 3D NAND flash, cross-point memory, phase change memory (PCM), etc.). Although the memory 104 is shown separate from the processor 102, in some examples the memory 104 may be fabricated as part of the processor 102 (e.g., on a same integrated circuit (IC) die as the processor 102, interconnected with the processor 102 in a same IC package, etc.).

In the illustrated example, an example operating system (OS) 106 and an example program 108 (e.g., a software application) are executed by the processor 102. The example program 108 executes within the context (e.g., in user space and/or kernel space) of the OS 106. Examples disclosed herein may be implemented to service memory copy requests generated by the OS 106 and/or the program 108 during runtime. For example, the OS 106 and/or the program 108 may be programmed to perform a plurality of memory copy operations during execution. When the OS 106 and/or the program 108 reach a point in execution requiring a memory copy operation, examples disclosed herein may be employed to service such memory copy request in a manner that uses cache more efficiently than prior memory copy operations. For example, the program 108 of the illustrated example includes a Message Passing Interface (MPI) 109. In the illustrated example, the MPI 109 is a user-level library that uses memory copy operations to implement MPI intra-node communications. Examples disclosed herein to perform memory copy operations may be used to improve such MPI intra-node communications performed by the MPI 109. Examples disclosed herein are also useful to improve any other aspects of the OS 106 and/or the program 108, and/or computing devices in general, that use memory copy operations.

The processor 102 of the illustrated example includes an example central processing unit (CPU) 110, an example cache 112, and an example memory controller 114. Although one of each is shown, more than one of each of the example CPU 110, the example cache 112, and/or the example memory controller 114 may be provided in the processor 102 in other examples. The CPU 110 of the illustrated example executes instructions of the OS 106 and/or instructions of the program 108 to enable operations of the OS 106 and/or the program 108. For example, the CPU 110 may execute memory copy instructions from the OS 106 and/or the program 108 to perform corresponding memory copy operations.

The cache 112 of the illustrated example is located in the processor 102 close to the CPU 110 to provide faster access to data than is possible when accessing data in the memory 104. The example cache 112 may be implemented to store less data than the memory 104 and, as such, is used to store only data deemed to improve data access efficiency the most. For example, data can be stored in the cache 112 when it is accessed frequently (e.g., a frequency that satisfies a threshold criterion for in cache storage) and/or when it is more recently accessed than other data (e.g., based on a least recently used (LRU) criterion for in-cache storage). In the illustrated example, data is stored in the cache 112 temporarily until it no longer satisfies criteria for remaining in the cache 112. In the illustrated example, a copy of the data is also stored in the memory 104 so that when it is overwritten in the cache 112, the data can be subsequently accessed, albeit at a slower access speed, from the memory 104.

The memory controller 114 of the illustrated example is provided as an interface between the CPU 110, the cache 112, and the memory 104 so that the CPU 110 can access data (e.g., read and/or write data) in the cache 112 and/or the memory 104, and/or the CPU 110 can copy data between different locations of the cache 112 and/or the memory 104 (e.g., between source and destination locations in the cache 112, between source and destination locations in the memory 104, between a source location in the cache 112 and a destination location the memory 104, and/or between a source location in the memory 104 and a destination location in the cache 112).

The illustrated example shows three groups of memory pages stored in different areas of the cache 112 and the memory 104. An example memory page group A 116a is stored entirely in the cache 112, an example memory page group B 116b includes some memory pages stored in the cache 112 and some memory pages stored in the memory 104, and an example memory page group C 116c is stored entirely in the memory 104. Example techniques disclosed herein can be used with target data of any data size (e.g., 64-byte data size, 64 kilobyte (KB) data size, cache line size, page data size, and/or any other data size) and/or with data accesses of any data size granularity (e.g., 64-byte data size granularity, 64 kilobyte (KB) data size granularity, cache line size granularity, page data size granularity, and/or any other data size granularity). In examples disclosed herein, when the processor 102 receives a memory copy request from the program 108 and/or the OS 106 to copy target data (e.g., one or more of the memory page groups 116a-c) between source and destination locations, the source and destination locations are provided as logical addresses of a virtual memory map. When the processor 102 executes a memory copy operation, the processor 102 determines whether the logical address of the source location corresponds to data stored in the cache 112. If so, the processor 102 reads the corresponding data from the cache 112 (e.g., in a 64-byte cache line size or any other data size). Otherwise, the processor 102 uses a translation lookaside buffer (TLB) to determine a physical memory address of the data in the memory 104 and reads the data from the memory 104.

Examples disclosed herein are useful to select different types of memory copy operations for copying target data (e.g., the memory pages 116a-c) between different locations of the cache 112 and/or memory 104 in such a way that improves speed performance of memory copy operations and/or decreases or eliminates instances of thrashing or polluting cache data in the cache 112. Thus, examples disclosed herein can be used to improve and/or maintain cache-use efficiencies. Examples disclosed herein perform memory copy operations by using an example learning sequence phase (or a data store analysis phase) (e.g., the example learning sequence phase 602 of FIG. 6) and an example main body copy phase (or a type-based copy execution phase) (e.g., the example main body copy phase 604 of FIG. 6). To service a memory copy operation request from the program 108 and/or the OS 106, the example learning sequence phase is used to perform a data store analysis to determine or estimate whether the target data (e.g., one of the memory page groups 116a-c) to be copied is stored mostly in the cache 112 or mostly in the memory 104. Such a data store analysis is performed by copying an initial portion of the target data to the destination location using a cache-based memory copy operation that attempts to read the portion of the target data from the cache 112. The data store analysis then determines a cache miss measure indicative of or corresponding to the amount of the initial portion of the target data that was located in the cache 112 during the copying operation during the learning sequence phase. The cache miss measure corresponding to the initial portion of the target data is used as an indicator representing a probability of whether none, some or all of the target data is located in the cache 112 or located in the memory 104.

In some examples, a type of cache miss measure that may be determined is a cache miss rate. In such examples, a cache miss rate threshold is used to determine whether a sufficient amount of the portion of the target data copied during the learning sequence phase (or a data store analysis phase) was located in the cache 112 to justify selecting a type of memory copy operation that uses the cache 112 to perform the copying of the remaining portion of the target data during the main body copy phase. In some examples, the cache miss rate threshold is user-configurable in that it can be set by programming statements in the program 108 and/or the OS 106 so that it can be changed during runtime of the program 108 and/or the OS 106. In other examples, the cache miss rate threshold is a fixed parameter such that it is set during a development phase and is not user-configurable during runtime of the program 108 and/or the OS 106. In any case, the cache miss rate threshold may be set as a percentage threshold (e.g., a percentage of total data reads for which data was not located in the cache 112), as a ratio (e.g., a number of cache misses relative to a total number of data reads), and/or as any other suitable type of value. In some examples, the cache miss rate threshold may be set to a value indicating that a majority of the portion of the target data copied must have been read from the cache 112 (e.g., a majority of the data reads from the source location accessed the data from the cache 112).

During the learning sequence phase (or a data store analysis phase), when the cache miss rate exceeds the cache miss rate threshold, it is determined that a sufficient amount of the initial portion of the target data was not located in the cache 112 to justify selecting a type of memory copy operation that uses the cache 112 to perform the copying of the remaining portion of the target data. As such, a type of memory copy operation that does not access the cache (e.g., does not overwrite cache data) is selected to copy the remaining portion of the target data to the destination location during the main body copy phase. When the cache miss rate is less than the cache miss rate threshold, it is determined that a sufficient amount of the initial portion of the target data was located in the cache 112 to justify selecting a type of memory copy operation that uses the cache 112 to perform the copying of remaining portion of the target data. As such, a type of memory copy operation that does access the cache 112 is selected to copy the remaining portion of the target data to the destination location during the main body copy phase. In this manner, when most or all of the target data is stored in the cache 112, the data access speed benefits of the cache 112 can be realized by selecting a cache-based type of memory copy operation that accesses the target data in the cache 112 to service the requested memory copy operation. However, when most or all of the target data is not stored in the cache 112 (e.g., it is stored in the memory 104), the benefits of not modifying data in the cache 112 that is accessed by other processes can be realized by selecting an off-cache or non-cache-based type of memory copy operation that copies the target data from the source location to the destination location without overwriting data in the cache 112 by bypassing copying the target data into the cache 112 as an intermediate write location before writing the target data to the destination location.

In some examples, instead of a cache miss rate and a cache miss rate threshold, the cache miss measure can be a cache miss count used in combination with a cache miss count threshold. For example, whenever a memory copy request of the program 108 and/or the OS 106 is serviced, the initial portion of the target data copied during the learning sequence phase (or a data store analysis phase) may be a fixed amount of data that stays the same for all memory copy requests. As such, the determination of whether at least some or all of the target data likely resides in the cache 112 can be based on a count of cache miss events that occurred during the copying of the initial portion of the target data. If the cache miss count exceeds a cache miss count threshold, it is determined that a sufficient amount of the initial portion of the target data was not located in the cache 112 to justify selecting a type of memory copy operation that uses the cache 112 to perform the copying of the remaining portion of the target data. On the other hand, if the cache miss count is less than the cache miss count threshold, it is determined that a sufficient amount of the initial portion of the target data was located in the cache 112 to justify selecting a type of memory copy operation that uses the cache 112 to perform the copying of the remaining portion of the target data. Similar to the cache miss rate threshold described above, the cache miss count threshold may be user-configurable during runtime of the program 108 and/or the OS 106, or it may be a fixed value that is not user-configurable during runtime.

In some examples, examples disclosed herein may test for in-cache or off-cache target data using equality conditions. For example, to determine that a cache-based memory copy operation should be used to service a memory copy operation, a data store analysis test may require that a zero cache miss rate or a zero cache miss count is achieved during the initial memory copy operation of the learning sequence phase (or a data store analysis phase). Alternatively, to determine that an off-cache or non-cache-based memory copy operation should be used to service a memory copy operation, a data store analysis test may require a cache miss rate of 100% or a cache miss count that equals the total number of reads performed during the initial memory copy operation of the learning sequence phase (or a data store analysis phase) (e.g., none of the initial portion of the target data was stored in the cache 112).

With reference to the memory page groups 116*a-c* of FIG. 1, a memory copy request from the program 108 and/or the OS 106 that identifies the target data as the memory page group A 116*a* would result in selection of a type of memory copy operation that uses the cache 112 to perform the copying of the memory page group A 116*a*. That is, since the entirety of the memory page group A 116*a* is stored in the cache 112 in the illustrated example of FIG. 1, the cache miss rate determined during the learning sequence phase (or a data store analysis phase) would be zero. Such a zero cache miss rate is indicative that the entirety of the initial portion of the target data (e.g., one or more pages but fewer than all pages of the memory page group A 116*a*) copied during the learning sequence phase (or a data store analysis phase) is stored in the cache 112. As another example, a memory copy request from the program 108 and/or the OS 106 that identifies the target data as the memory page group C 116*c* would result in selection of a type of memory copy operation that does not use the cache 112 to perform the copying of the memory page group C 116*c*. That is, since the entirety of the memory page group C 116*c* is not stored in the cache 112 in the illustrated example of FIG. 1 and must be accessed from the memory 104, the cache miss rate determined during the learning sequence phase (or a data store analysis phase) would be 100% (or all data reads resulted in cache miss events). Such a 100% cache miss rate is indicative that the entirety of the initial portion of the target data (e.g., one or more pages but fewer than all pages of the memory page group A 116*a*) copied during the learning sequence phase (or a data store analysis phase) is not stored in the cache 112. In the above two examples, the cache miss rate threshold is set to a value greater than zero and less than 100%. As such, the cache miss rate of zero for the memory page group A 116*a* is less than the cache miss rate threshold, resulting in selection of a type of memory copy operation that uses the cache 112 to perform the copying of the remaining portion of the memory page group A 116*a* during a main body copy phase. On the other hand, the cache miss rate of 100% corresponding to the memory page group C 116*c* is greater than the cache miss rate threshold, resulting in selection of a type of memory copy operation that does not use cache 112 to perform the copying of the remaining portion of the memory page group C 116*c* during a main body copy phase.

As yet another example, when servicing a memory copy request from the program 108 and/or the OS 106 that identifies the target data as the memory page group B 116*b*, if the initial portion of the memory page group B 116*b* copied during the learning sequence phase (or a data store analysis phase) results in a cache miss rate that is less than the cache miss rate threshold, a type of memory copy operation that does use the cache 112 is selected to perform the copying of the remaining portion of the memory page group B 116*b* during a main body copy phase. Otherwise, if the initial portion of the memory page group B 116*b* copied during the learning sequence phase (or a data store analysis phase) results in a cache miss rate that exceeds the cache miss rate threshold, a type of memory copy operation that does not use the cache 112 is selected to perform the copying of the remaining portion of memory page group B 116*b* during a main body copy phase.

In examples disclosed herein, the initial portion of the target data that is copied during the learning sequence phase (or the data store analysis phase) to determine whether at least some of the target data is located in the cache 112 can be a small contiguous fraction or portion of the target data such as one or more memory pages but fewer than all of the memory pages of any of the memory page groups 116*a-c* to be copied. In this manner, the data copied for such analysis is not a large amount of data but is data that needs to be moved anyway. As such, any machine cycles used to perform such analysis are not completely inefficient since they operate to copy some of the target data while simultaneously being useful to determine whether a sufficient amount of the target data is stored in the cache 112 to justify selecting a type of memory copy operation that uses the cache 112 to perform the requested memory copy operation.

Examples disclosed herein are described in connection with using 'memcpy' functions to achieve such different types of memory copy operations. Example 'memcpy' functions include an example memcpy_copy_from_cache_to_cache(d, s, n) memory copy function, an example memcpy_copy_from_cache_to_memory(d, s, n) memory copy function, an example memcpy_copy_from_memory_to_cache(d, s, n) memory copy function, and an example memcpy_copy_from_memory_to_memory(d, s, n) memory copy function. The example memcpy_copy_from_cache_to_cache(d, s, n) memory copy function may be used to copy data of a specified size (n) (e.g., the amount of data in bytes) from a source location (s) (e.g., an address of a location or area at which data to be copied is stored) in a cache to a destination location (d) (e.g., an address of a location or area to which data is to be copied) in the cache. The example memcpy_copy_from_cache_to_memory(d, s, n) memory copy function may be used to copy data of a specified size (n) from a source location (s) in the cache to a destination location (d) in a memory (e.g., a volatile random access memory (RAM) or a non-volatile memory) that is separate from the cache. The example memcpy_copy_from_memory_to_cache(d, s, n) memory copy function may be used to copy data of a specified size (n) from a source location (s) in the memory to a destination location (d) in the cache. The example memcpy_copy_from_memory_to_memory(d, s, n) memory copy function may be used to copy data of a specified size (n) from a source location (s) in the memory to a destination location (d) in the memory.

To determine cache miss rates, examples disclosed herein use an example Read Performance Monitoring Counter (RDPMC) function. The example RDPMC function can be used by executing it in association with the memory copy operation of an initial portion of the target data during the learning sequence phase (or the data store analysis phase). In examples disclosed herein, the RDPMC function is executed based on an assembly level RDPMC instruction that causes the processor 102 to read one or more of its performance monitor counters 120. The performance monitor counters 120 of the illustrated example are registers of the processor 102 that can be programmed to monitor different types of events or status of the processor 102. In examples disclosed herein, during the learning sequence phase, the performance monitor counters 120 of the processor 102 are programmed to monitor and count LLC (last level cache) cache miss events of the cache 112 when accessing data (e.g., when reading target data of a memory copy operation). In examples disclosed herein, LLC refers to a highest-level cache (e.g., L3 cache) that is shared between all CPU cores of a processor. However, cache miss events for any other level of cache may be used in other examples of techniques disclosed herein. To determine the cache miss rate corresponding to a memory copy operation, the processor 102 executes the RDPMC function before and after the memory copy operation. In this manner, the RDPMC function executed before the memory copy operation is performed to obtain an initial state or pre-copy state of the performance monitor counter(s) 120, and the RDPMC function executed after the memory copy operation is used to obtain a post-copy state of the performance monitor counter(s) 120 after the memory copy is performed. The difference between the pre-copy state and the post-copy state values of the performance monitor counter(s) 120 represents the number of cache miss events corresponding to the memory copy operation of the initial portion of the target data. The number of cache miss events can then be used to determine the cache miss rate for the memory copy operation. For example, each cache miss event represents an instance when a data unit (e.g., a byte, a word, etc.) to be read was not located in the cache 112 causing the read operation to access the memory 104 to access the data unit. If a memory copy operation is used during the learning sequence phase (or the data store analysis phase) to copy 1024 bytes (B) of aligned data (e.g., a 64-byte cache line size) using 64-bit word reads (i.e., 8-byte word reads), 128 word-length reads are needed to copy the 1024 bytes of data from a source location to a destination location. If only 256 bytes are stored in the cache 112, the performance monitor counter(s) 120 will count 12 cache misses (e.g., 12=(1024 bytes)/(64-byte cache line size)−(256 bytes of in-cache data)/(64-byte cache line size)). As such, the cache miss rate, determined as cache miss rate=cache miss events/total reads, is 0.75 (e.g., 0.75=12/16). In other examples, other data copy sizes may be used for memory copy operations. For example, memory copy operations of cache line sizes other than 64 bytes may be employed in connection with examples disclosed herein. In addition, other data read sizes (e.g., other than 8-byte word reads) may be employed for memory copy operations implemented using examples disclosed herein.

When executed, the RDPMC function uses some number of machine cycles to read the performance monitor counter(s) 120 (e.g., the RDPMC function may use 40 cycles in some processors) during the learning sequence phase (or the data store analysis phase). However, machine cycles are not completely inefficient since the RDPMC function is used in connection with copying some of the target data while simultaneously being useful to determine whether a sufficient amount of the target data is stored in the cache 112 to justify selecting a type of memory copy operation that uses the cache 112 to perform the requested memory copy operation on the remaining portion of the target data.

Although examples disclosed herein are described in connection with using the RDPMC function for determining the cache miss rate during the learning sequence phase (or the data store analysis phase), the cache miss rate may be determined using any other suitable technique for analyzing CPU state in other examples. For example, the cache miss rate may be determined using a Cache Monitoring Technology (CMT) feature of processors developed and provided by Intel Corporation. Example CMT operations can be used to determine usage of cache by applications running on a platform.

Figure 2:
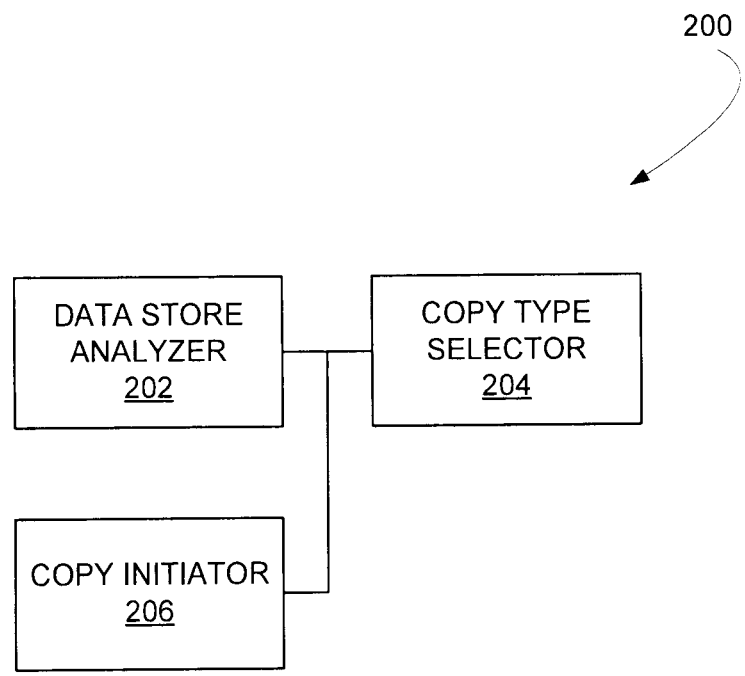
FIG. 2 is an example apparatus that may be used to perform adaptive memory copy operations in accordance with the teachings of this disclosure.

FIG. 2 is an example apparatus 200 that may be used to perform adaptive memory copy operations in accordance with the teachings of this disclosure. The apparatus 200 of the illustrated example includes an example data store analyzer 202, an example copy type selector 204, and an example copy initiator 206. In some examples, the apparatus 200 is implemented as part of the program 108, as part of the OS 106, and/or as part of both the program 108 and the OS 106. In some examples, some of the apparatus 200 is implemented by the processor 102 and some of the apparatus 200 is implemented by the program 108 and/or the OS 106. In yet other examples, the apparatus 200 is implemented as part of the processor 102. For example, the processor 102 may be provided with a hardware accelerator that implements some or all of the apparatus 200.

The example data store analyzer 202 is used to perform data store analyses during example learning sequence phases (or a data store analysis phases) to determine or estimate whether the target data (e.g., one of the memory page groups 116a-c) to be copied is stored mostly in the cache 112 or mostly in the memory 104. For example, the data store analyzer 202 can perform a data store analysis by determining a cache miss rate as described above corresponding to a memory copy operation of an initial portion of the target data to be copied. The example data store analyzer 202 determines whether the cache miss rate is less than or exceeds a cache miss rate threshold to identify whether: (1) a sufficient amount of the initial portion of the target data was accessed from the cache 112 to justify selecting a type of memory copy operation that uses the cache 112 to perform the copying of the remaining portion of the target data during the main body copy phase, or (2) a sufficient amount of the initial portion of the target data was not accessed from the cache 112 (e.g., it was accessed from the memory 104) such that a type of memory copy operation that does not use the cache 112 should be selected to perform the copying of the remaining portion of the target data during the main body copy phase.

The example copy type selector 204 is provided to select a type of memory copy operation to use for copying target data between source and destination locations. For example, the copy type selector 204 uses the analysis results provided by the data store analyzer 202 to select one of an example memcpy_copy_from_cache_to_cache(d, s, n) memory copy function, an example memcpy_copy_from_cache_to_memory(d, s, n) memory copy function, an example memcpy_copy_from_memory_to_cache(d, s, n) memory copy function, or an example memcpy_copy_from_memory_to_memory(d, s, n) memory copy function.

The example copy initiator 206 initiates memory copy operations during the learning sequence phase (or data store analysis phase) and during the main body copy phase (or type-based copy execution phase). For example, the copy initiator 206 causes the processor 102 to perform memory copy operations to service memory copy requests generated during execution of the program 108 and/or the OS 106 of FIG. 1.

While an example manner of implementing the apparatus 200 is illustrated in FIG. 2, one or more of the elements, processes and/or devices illustrated in FIG. 2 may be combined, divided, re-arranged, omitted, eliminated and/or implemented in any other way. Further, the example data store analyzer 202, the example copy type selector 204, the example copy initiator 206 and/or, more generally, the example apparatus 200 of FIG. 2 may be implemented by hardware, software, firmware and/or any combination of hardware, software and/or firmware. Thus, for example, any of the example data store analyzer 202, the example copy type selector 204, the example copy initiator 206 and/or, more generally, the example apparatus 200 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data store analyzer 202, the example copy type selector 204, and/or the example copy initiator 206 is/are hereby expressly defined to include a tangible computer readable storage device or storage disk such as a memory, a digital versatile disk (DVD), a compact disk (CD), a Blu-ray disk, etc. storing the software and/or firmware. Further still, the example apparatus 200 of FIG. 2 may include one or more elements, processes and/or devices in addition to, or instead of, those illustrated in FIG. 2, and/or may include more than one of any or all of the illustrated elements, processes and devices.

Figure 3:
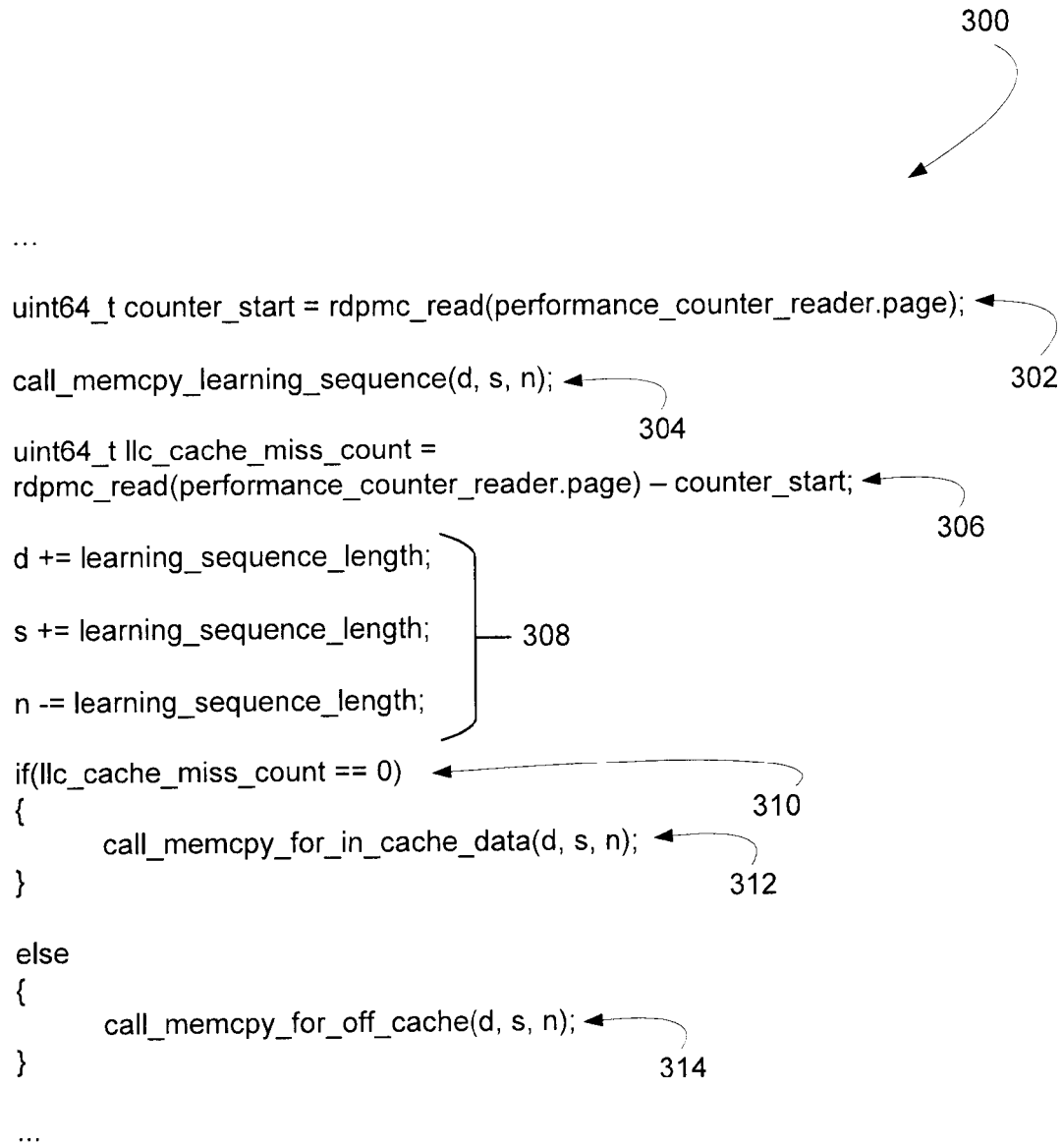
FIG. 3 is example pseudocode representative of machine readable instructions that may be executed to analyze storage locations of data and perform adaptive memory copy operations based on such storage locations in accordance with the teachings of this disclosure.

FIG. 3 is example pseudocode 300 representative of machine readable instructions that may be executed to analyze storage locations of data and perform adaptive memory copy operations based on such storage locations in accordance with the teachings of this disclosure. In the illustrated example, a pre-copy state of the performance monitor counter(s) 120 (FIG. 1) is determined using a first RDPMC read programming statement 302 to obtain an initial pre-copy counter value ("counter_start") of the performance monitor counter(s) 120. A learning sequence memory copy programming statement 304 is used to perform an initial memory copy operation during the learning sequence phase (or the data store analysis phase) to copy an initial portion of the target data to determine whether at least some of the target data is located in the cache 112 (FIG. 1). In the illustrated example, the initial memory copy operation used to copy the initial portion of the total target data during the learning sequence phase is a cache-based memory copy operation (e.g., a memcpy_copy_from_cache_to_cache(d, s, n) memory copy function or a memcpy_copy_from_cache_to_memory(d, s, n) memory copy function) to attempt data reads for the initial portion of the target data from the cache 112.

After performing the initial memory copy operation, a cache miss count programming statement 306 is used to determine a cache miss count value (e.g., a LLC cache miss count) in the illustrated example by subtracting the initial pre-copy counter value ("counter_start") of the performance monitor counter(s) 120 from a post-copy counter value of the performance monitor counter(s) 120. In the illustrated example, the post-copy counter value of the performance monitor counter(s) 120 is obtained using a second RDPMC read programming statement to read a post-copy state of the performance monitor counter(s) 120. Although a cache miss count is used in the example pseudocode 300, in other examples, an example cache miss rate as described above in connection with FIG. 1 may be used instead. For example, the cache miss rate may be determined by dividing the cache miss count determined at programming statement 306 by the total number of reads performed by the initial memory copy operation represented by the learning sequence memory copy programming statement 304.

A plurality of offset programming statements 308 are used to increment the destination address (d) and the source address (s), and to decrement the specified size (n) of the target data to be copied. The offsets of the destination address (d) and the source address (s), and the decreasing of the specified size (n) are used during the main body copy phase (or a type-based copy execution phase) to copy the remaining portion of the target data and to avoid re-copying the initial portion of the target data that was copied during the learning sequence phase (or the data store analysis phase). For example, the "learning_sequence_length" parameter of the programming statements 308 is a value equal to the size (e.g., amount in bytes) of the initial portion of the target data that was copied at the learning sequence memory copy programming statement 304. By incrementing the destination address (d) and the source address (s), and decreasing the specified size (n) of the target data to be copied based on the "learning_sequence_length" parameter value, the subsequent copying of the remaining portion of the target data during the main body copy phase (or a type-based copy execution phase) starts the copying at an address in the target data at which the initial memory copy operation of the learning sequence memory copy programming statement 304 stopped, and copies the amount of data remaining of the target data exclusive of the initial portion of the target data previously copied.

An example "if-else" statement 310 of FIG. 3 is used to determine whether the cache miss count is equal to zero. The "if-else" statement 310 of the illustrated example uses an equality condition (==) in which the cache miss count is tested for equality to zero. If the cache miss count is equal to zero, an in-cache memory copy programming statement 312 calls an in-cache type of memory copy operation to copy the remaining portion of the target data from the source location (s) to the destination location (d). For example, the in-cache memory copy programming statement 312 can call a memcpy_copy_from_cache_to_cache(d, s, n) memory copy function or a memcpy_copy_from_cache_to_memory (d, s, n) memory copy function depending on whether the destination is intended to be in the cache 112 or in the memory 104. Whether the intended destination is a cache location or a memory location can be based on cache criteria such as when the most recent access of the target data occurred and/or the frequency of access of the target data. Otherwise, if the cache miss count is not equal to zero, an off-cache memory copy programming statement 314 calls an off-cache type of memory copy operation to copy the remaining portion of the target data from the source location (s) to the destination location (d) while avoiding or bypassing copying the target data into the cache 112 as an intermediate write location before writing the target data to the destination location. For example, the off-cache memory copy programming statement 314 can call a memcpy_copy_from_memory_to_cache(d, s, n) memory copy function or a memcpy_copy_from_memory_to_memory(d, s, n) memory copy function depending on whether the destination is intended to be in the cache 112 or in the memory 104. In the illustrated example, the memcpy_copy_from_memory_to_cache(d, s, n) memory copy function is considered an off-cache type of memory copy operation because read operations do not attempt to read the target data from the cache 122, but instead read the target data from the memory 104. In addition, the memcpy_copy_from_memory_to_cache(d, s, n) memory copy function may be executed without using the cache 112 as an intermediate write location but only as the final destination location (d) at which to write the target data after reading the target data from the source location (s) in the memory 104.

Figure 4:
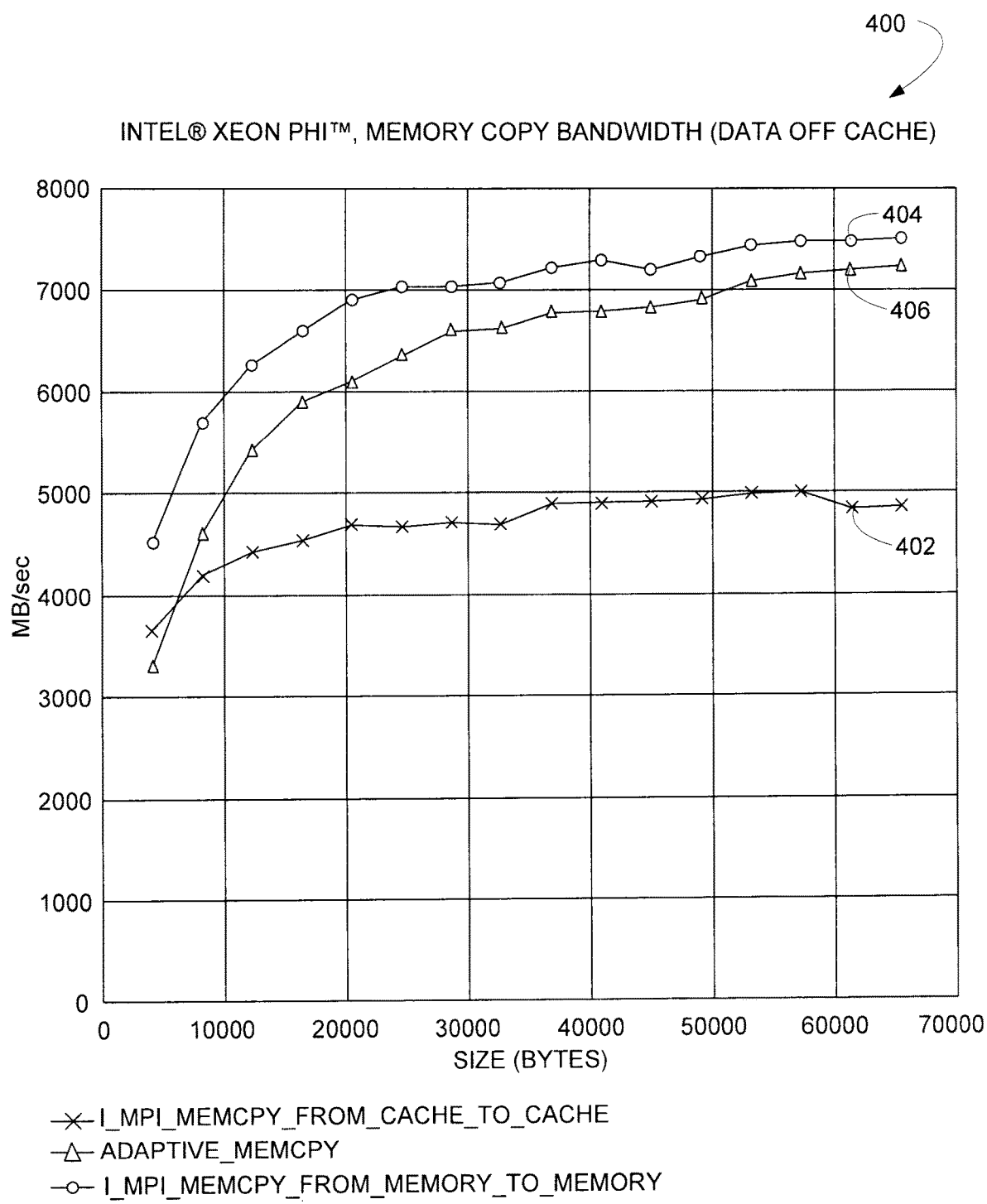
FIG. 4 is an example off-cache performance graph showing data transfer performance for off-cache data that is copied using adaptive memory copy operations implemented in accordance with the teachings of this disclosure.
Figure 5:
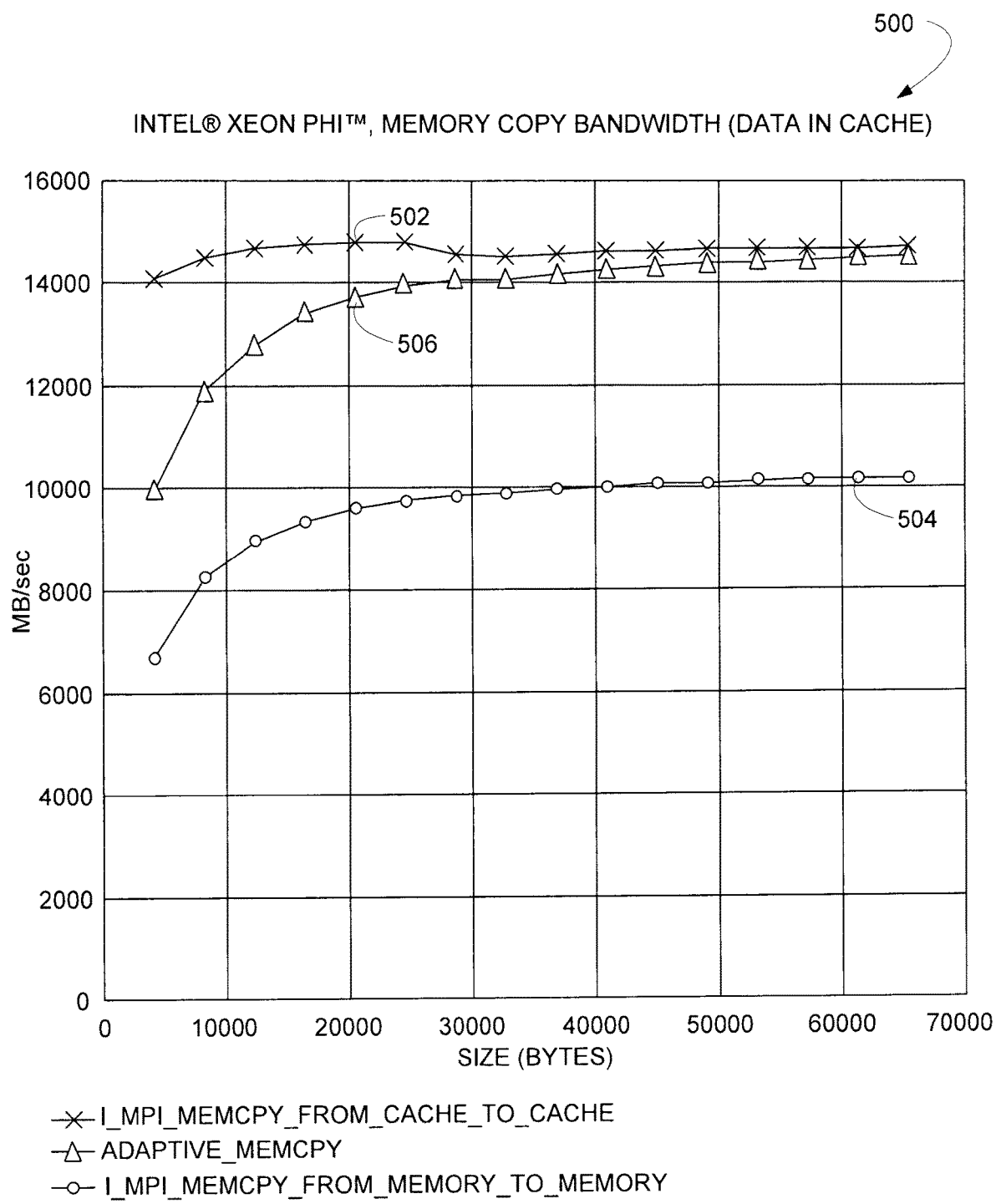
FIG. 5 is an example on-cache performance graph showing data transfer performance for in-cache data that is copied using adaptive memory copy operations implemented in accordance with the teachings of this disclosure.

FIG. 4 is an example off-cache performance graph 400 showing data transfer performance for off-cache data that is copied using memory copy operations implemented in accordance with the teachings of this disclosure. FIG. 5 is an example on-cache performance graph 500 showing data transfer performance for in-cache data that is copied using memory copy operations implemented in accordance with the teachings of this disclosure. The example performance graphs 400 and 500 are based on data transfer speed performances observed when implementing techniques disclosed herein on an Intel® Xeon Phi™ processor developed and manufactured by Intel Corporation.

The example off-cache performance graph 400 includes a cache-to-cache data transfer speed performance line plot 402 that represents data transfer speeds (e.g., megabytes per second (MB/sec)) when using a cache-based memory copy operation (e.g., a memcpy_copy_from_cache_to_cache(d, s, n) memory copy function) regardless of analyzing whether the target data is located in the cache 112 or the memory 104, a memory-to-memory data transfer speed performance line plot 404 that represents data transfer speeds for a memory-based memory copy operation (e.g., a memcpy_copy_from_memory_to_memory(d, s, n) memory copy function) regardless of analyzing whether the target data is located in the cache 112 or the memory 104, and an adaptive memory copy data transfer speed performance line plot 406 that represents data transfer speeds for an adaptive memory copy operation implemented in accordance with the teachings of this disclosure. In the illustrated example, since the target data is off-cache data (e.g., data stored in the memory 104), the memory-to-memory data transfer speed performance line plot 404 shows better data transfer speed performance than the cache-to-cache data transfer speed performance line plot 402. The adaptive memory copy data transfer speed performance line plot 406 shows that using the adaptive memory copy operation techniques disclosed herein, which are based on analyzing whether the target data is located in the cache 112 or the memory 104, achieves data transfer speed performance that is almost as good as the data transfer speed performance of the memory-to-memory data transfer speed performance line plot 404. In the illustrated example, the adaptive memory copy data transfer speed performance line plot 406 shows some lower performance than the memory-to-memory data transfer speed performance line plot 404 due to the overhead machine cycles used by the RDMPC function used during the learning sequence phase (or the data store analysis phase) to identify which type of memory copy operation to select. However, since a more suitable type of memory copy operation is selected based on where the target data is located and is used to copy the remaining portion of the target data during a main body copy phase (or a type-based copy execution phase), the performance shown by the adaptive memory copy data transfer speed performance line plot 406 is better than the cache-to-cache data transfer speed performance line plot 402.

The example in-cache performance graph 500 includes a cache-to-cache data transfer speed performance line plot 502 that represents data transfer speeds (e.g., megabytes per second (MB/sec)) when using a cache-based memory copy operation (e.g., a memcpy_copy_from_cache_to_cache(d, s, n) memory copy function) regardless of analyzing whether the target data is located in the cache 112 or the memory 104, a memory-to-memory data transfer speed performance line plot 504 that represents data transfer speeds for a memory-based memory copy operation (e.g., a memcpy_copy_from_memory_to_memory(d, s, n) memory copy function) regardless of analyzing whether the target data is located in the cache 112 or the memory 104, and an adaptive memory copy data transfer speed performance line plot 506 that represents data transfer speeds for an adaptive memory copy operation implemented in accordance with the teachings of this disclosure. In the illustrated example, since the target data is on-cache data (e.g., data stored in the cache 112), the cache-to-cache data transfer speed performance line plot 502 shows better data transfer speed performance than the memory-to-memory data transfer speed performance line plot 504. The adaptive memory copy data transfer speed performance line plot 506 shows that using the adaptive memory copy operation techniques disclosed herein, which are based on analyzing whether the target data is located in the cache 112 or the memory 104, achieves data transfer speed performance that is almost as good as the data transfer speed performance of the cache-to-cache data transfer speed performance line plot 502. In the illustrated example, the adaptive memory copy data transfer speed performance line plot 506 shows some lower performance than the cache-to-cache data transfer speed performance line plot 502 due to the overhead machine cycles used by the RDMPC function used during the learning sequence phase (or the data store analysis phase) to identify which type of memory copy operation to select. However, since a more suitable type of memory copy operation is selected based on where the target data is located and is used to copy the remaining portion of the target data during a main body copy phase (or a type-based copy execution phase), the performance shown by the adaptive memory copy data transfer speed performance line plot 506 is better than the memory-to-memory data transfer speed performance line plot 504.

Figure 6:
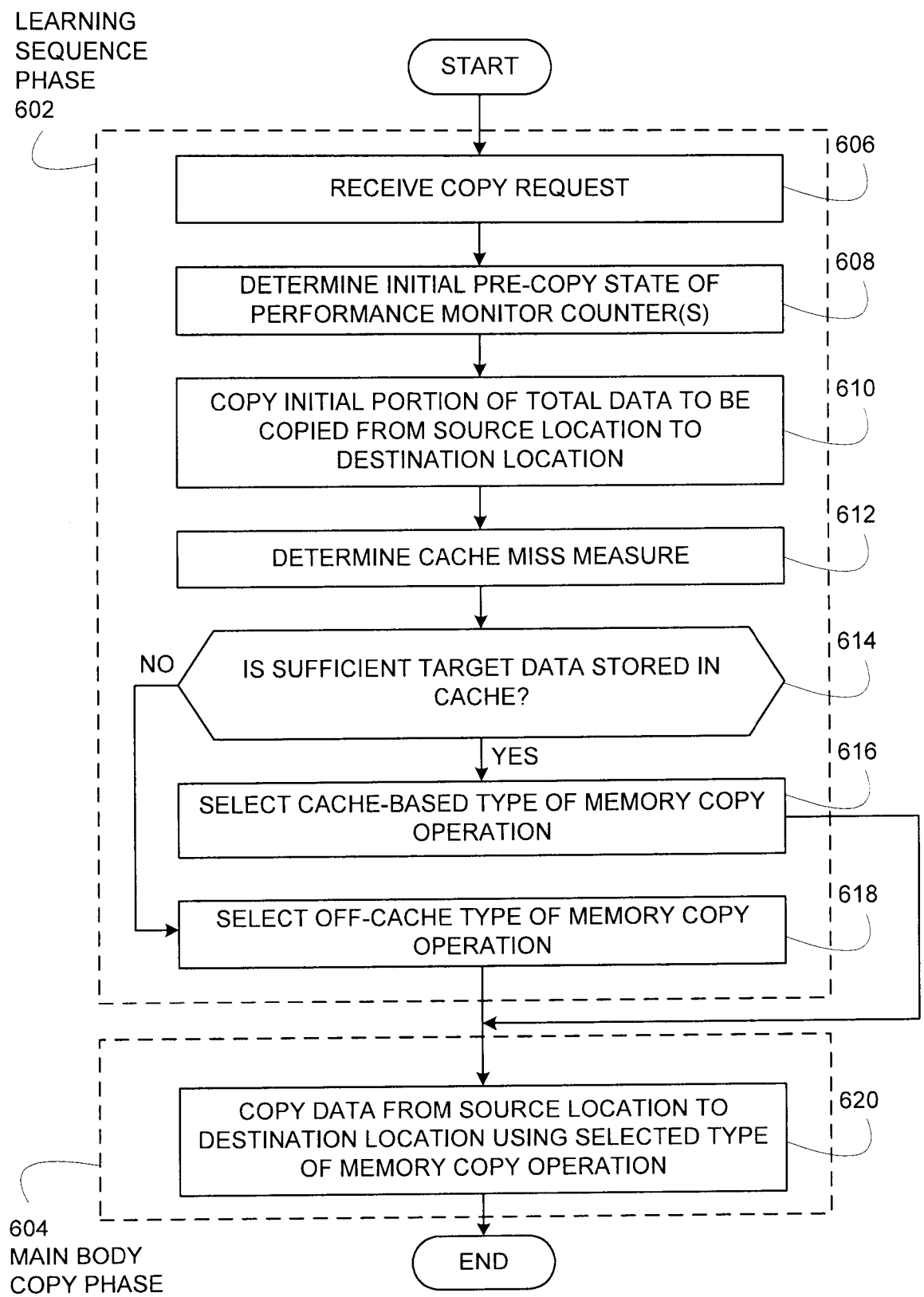
FIG. 6 is a flow diagram representative of example machine readable instructions that may be executed by a processor to analyze storage locations of data and perform adaptive memory copy operations based on such storage locations in accordance with the teachings of this disclosure.

A flowchart representative of example machine readable instructions for implementing the apparatus 200 of FIG. 2 is shown in FIG. 6. In this example, the machine readable instructions correspond to a program for execution by a processor such as the processor 102 shown in the example processor system 100 of FIG. 1 and the processor system 700 discussed below in connection with FIG. 7. The program may be embodied in software stored on a tangible computer readable storage medium such as a CD-ROM, a floppy disk, a hard drive, a digital versatile disk (DVD), a Blu-ray disk, or a memory associated with the processor 102, but the entire program and/or parts thereof could alternatively be executed by a device other than the processor 102 and/or embodied in firmware or dedicated hardware. Further, although the example program is described with reference to the flowchart illustrated in FIG. 6, many other methods of implementing the example apparatus 200 may alternatively be used. For example, the order of execution of the blocks may be changed, and/or some of the blocks described may be changed, eliminated, or combined.

As mentioned above, the example process of FIG. 6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example process of FIG. 6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The example flowchart of FIG. 6 is representative of example machine readable instructions that may be executed by the processor 102 (FIGS. 1 and 7) to analyze storage locations of data and perform adaptive memory copy operations based on such storage locations in accordance with the teachings of this disclosure. The illustrated example of FIG. 6 includes an example learning sequence phase 602 and an example main body copy phase 604. During the example learning sequence phase 602, a data store analysis is performed to identify whether at least some target data to be copied is stored in the cache 112. During the example main body copy phase 604, the remainder of the target data that was not copied during the learning sequence phase 602 is copied based on a type of memory copy operation selected during the learning sequence phase 602.

The process of FIG. 6 begins at block 606 at which the example data store analyzer 202 (FIG. 2) receives a memory copy request. The data store analyzer 202 determines an initial pre-copy state of the performance monitor counter(s) 120 (block 608). For example, the data store analyzer 202 may program the performance monitor counter(s) 120 to monitor and count cache miss events of the cache 112 when accessing data (e.g., when reading the initial portion of the target data). The data store analyzer 202 may also cause the processor 102 to execute the RDMPC instruction to read the state of the performance monitor counter(s) 120 to obtain the pre-copy state value before copying the initial portion of the target data.

The example copy initiator 206 (FIG. 2) initiates a memory copy operation to copy an initial portion of the total target data from the source location to the destination location (block 610). For example, the copy initiator 206 can provide the processor 102 with a memory copy instruction to copy one or more pages but fewer than all pages of the target data. In the illustrated example, the memory copy operation used to copy the initial portion of the total target data during the learning sequence phase 602 is a cache-based memory copy operation (e.g., a memcpy_copy_from_cache_to_cache(d, s, n) memory copy function or a memcpy_copy_from_cache_to_memory(d, s, n) memory copy function) to attempt data reads for the initial portion of the target data from the cache 112.

The example data store analyzer 202 determines a cache miss measure (block 612). In the illustrated example, the cache miss measure is indicative of the amount of the initial portion of the target data copied at block 610 that was stored in the cache 112. The cache miss measure determined at block 612 may be any suitable type of cache miss measure. For example, after the data store analyzer 202 causes the processor 102 to execute the RDMPC instruction to read a post-copy state value of the performance monitor counter(s) 120, the data store analyzer 202 may use the pre-copy and post copy state values of the performance monitor counter(s) 120 to determine a cache miss rate as discussed above in connection with FIG. 1. Alternatively, instead of a cache miss rate, the data store analyzer 202 can use the pre-copy and post-copy state values of the performance monitor counter(s) 120 to determine a cache miss count as discussed above in connection with FIG. 3.

The example data store analyzer 202 determines whether a sufficient amount of the target data is stored in the cache 112 (block 614). For example, the data store analyzer 202 can compare a cache miss rate determined at block 612 to a cache miss rate threshold. Alternatively, the data store analyzer 202 may compare a cache miss count determined at block 612 to an equality condition criterion (e.g., an equality condition of zero cache miss counts). In any case, the data store analyzer 202 uses the cache miss measure determined at block 612 to determine whether a sufficient amount of the initial portion of the target data is stored in the cache 112 to justify selection of a cache-based memory copy operation as described above in connection with FIG. 1.

If the data store analyzer 202 determines at block 614 that a sufficient amount of the target data is stored in the cache 112, the example copy type selector 204 (FIG. 2) selects a cache-based type of memory copy operation (block 616). For example, the copy type selector 204 selects a cache-based type of memory copy operation (e.g., a memcpy_copy_from_cache_to_cache(d, s, n) memory copy function or a memcpy_copy_from_cache_to_memory(d, s, n) memory copy function) to copy the remaining portion of the target data from a source location to a destination location. Otherwise, if the data store analyzer 202 determines at block 614 that there is not a sufficient amount of the target data stored in the cache 112, the example copy type selector 204 (FIG. 2) selects an off-cache type of memory copy operation (block 618). For example, the copy type selector 204 selects an off-cache type of memory copy operation (e.g., a memcpy_copy_from_memory_to_cache(d, s, n) memory copy function or a memcpy_copy_from_memory_to_memory(d, s, n) memory copy function) to copy the remaining portion of the target data from a source location to a destination location while avoiding or bypassing copying the target data into the cache 112 as an intermediate write location before writing the target data to the destination location.

After selecting the type of memory copy operation in the learning sequence phase 602 in the illustrated example, control passes to the main body copy phase 604. In the main body copy phase 604, the example copy initiator 206 (FIG. 2) causes the processor 102 to copy the remaining portion of the target data from the source location to the destination location using the selected type of memory copy operation (block 620). The example process of FIG. 6 then ends.

Figure 7:
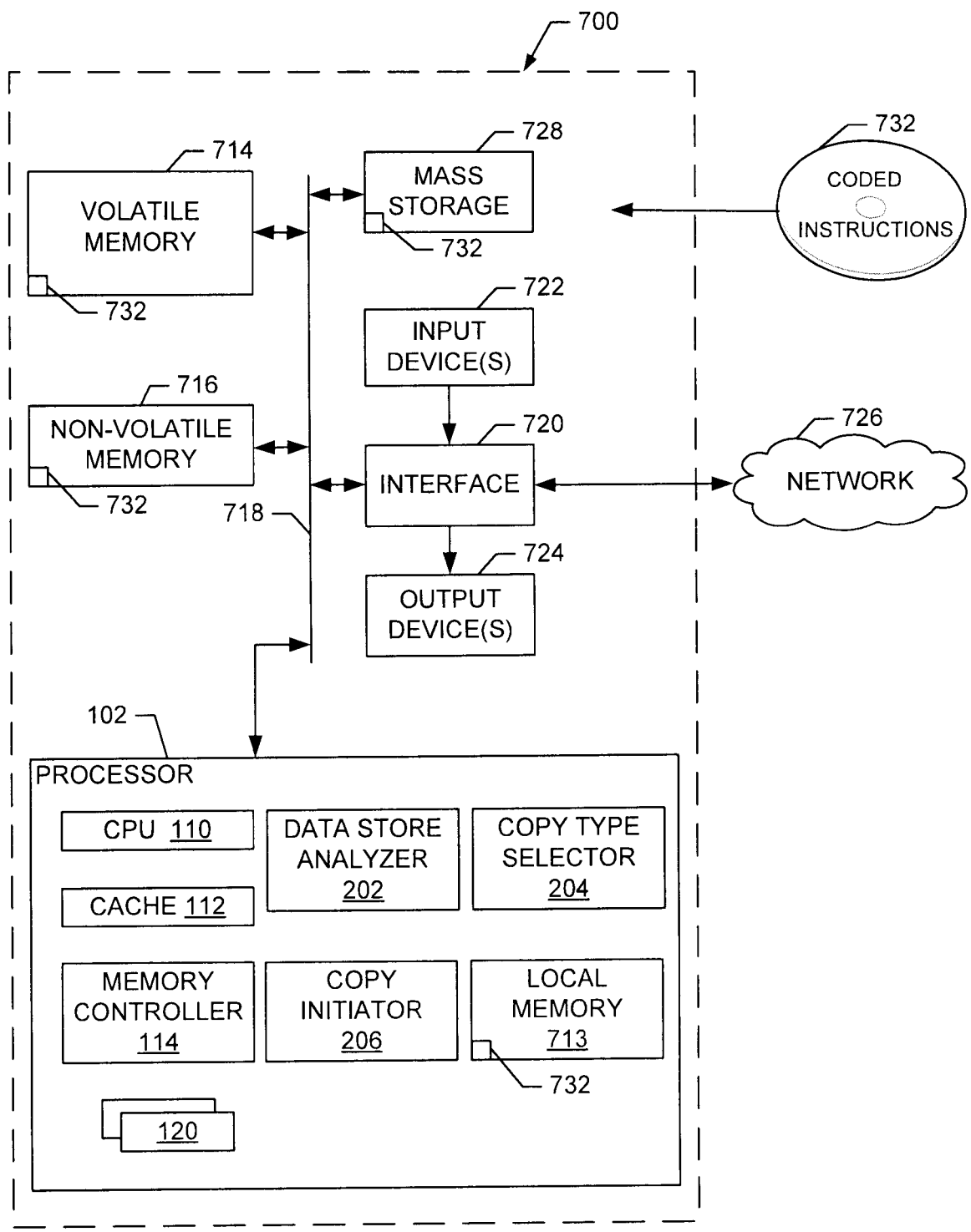
FIG. 7 is an example processor platform capable of executing the example computer readable instructions represented by FIGS. 3 and 6 to implement the example apparatus of FIG. 2 in accordance with teachings of this disclosure to analyze storage locations of data and perform adaptive memory copy operations based on such storage locations.

FIG. 7 is a block diagram of an example processor platform 700 capable of executing the instructions of FIGS. 3 and/or 6 to implement the example apparatus 200 of FIG. 2. The processor platform 700 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 700 of the illustrated example includes the processor 102 of FIG. 1. The processor 102 of the illustrated example is hardware. For example, the processor 102 can be implemented by one or more integrated circuits, logic circuits, microprocessors or controllers from any desired family or manufacturer.

The processor 102 of the illustrated example includes a local memory 713 (e.g., an SRAM memory that may implement the memory 104 of FIG. 1). The example processor 102 is shown as including the CPU 110, the cache 112, the memory, the memory controller 114, and the performance monitor counters 120 of FIG. 1. Also in the illustrated example, the processor 102 implements the data store analyzer 202, the copy type selector 204, and the copy initiator 206 of FIG. 2. The processor 102 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by the memory controller 114. One or both of the volatile memory 714 and/or the non-volatile memory 716 may implement the memory 104 of FIG. 1.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit(s) a user to enter data and commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), a touchscreen, a tactile output device, a printer and/or speakers). The interface circuit 720 of the illustrated example, thus, typically includes a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives. In some examples, the mass storage devices 728 may be used to implement the memory 104 of FIG. 1.

Coded instructions 732 representative of the example machine readable instructions of FIGS. 3 and 6 may be stored in the mass storage device 728, in the volatile memory 714, in the non-volatile memory 716, and/or on a removable tangible computer readable storage medium such as a CD or DVD.

From the foregoing, it will be appreciated that the above disclosed methods, apparatus and articles of manufacture are useful to perform adaptive memory copy operations by adaptively selecting cache-based or off-cache types of memory copy operations during runtime. In this manner, cache is used in a more efficient manner by not performing unnecessary intermediate cache writes to implement such memory copy operations, which improves speed performance of memory copy operations and preserves cache data when overwriting such data during a memory copy operation is not necessary. Such preserving of cache data improves performance of processor systems because cache data that is frequently accessed and/or most recently accessed is preserved in cache without being overwritten. Thus, processes reliant on that cache data can access the data from cache during subsequent memory access requests at a much faster data access speed than could be achieved when accessing the data from a slower memory such as RAM or other non-cache memory. Maintaining or improving cache use efficiency in this manner also improves power consumption of a processor system by decreasing the amount of machine cycles used to access data. That is, when more data accesses can be made from cache, less machine cycles are needed than when accessing data from non-cache memory because cache operates at faster speeds than non-cache memory. As such, by adaptively selecting cache-based or off-cache types of memory copy operations during runtime, examples disclosed herein use cache more efficiently and improve hardware performance and power consumption performance of processor systems.

The following pertain to further examples disclosed herein.

Example 1 is a method to perform a memory copy operation. The method of Example 1 includes copying a first portion of data from a source location to a destination location, the first portion of the data being less than all of the data intended to be copied from the source location to the destination location; determining a cache miss measure indicative of an amount of the first portion of the data that is located in a cache; selecting a type of memory copy operation based on the cache miss measure; and initiating the memory copy operation based on the selected type of memory copy operation to copy a second portion of the data from the source location to the destination location.

In Example 2, the subject matter of Example 1 can optionally include that the cache miss measure is a cache miss rate, and that the selecting of the type of memory copy operation includes: when the cache miss rate is less than a threshold, selecting a cache-based type of memory operation; and when the cache miss rate is greater than the threshold, selecting a non-cache-based type of memory operation.

In Example 3, the subject matter of any one of Examples 1-2 can optionally include that when the cache miss rate is greater than the threshold, the non-cache-based type of memory copy operation is a memory-to-memory copy operation to bypass copying the data into the cache as an intermediate write location when copying the data from the source location to the destination location.

In Example 4, the subject matter of any one of Examples 1-3 can optionally include that when the cache miss rate is less than the threshold, the cache-based type of memory copy operation is at least one of a cache-to-memory copy operation or a cache-to-cache copy operation.

In Example 5, the subject matter of any one of Examples 1-4 can optionally include generating the cache miss measure by copying the first portion of the data in combination with executing a Read Performance Monitoring Counter instruction.

In Example 6, the subject matter of any one of Examples 1-5 can optionally include that the data includes a plurality of memory pages, the first portion of the data being less than all of the plurality of memory pages.

In Example 7, the subject matter of any one of Examples 1-6 can optionally include that the data includes a plurality of cache lines, the first portion of the data being less than all of the plurality of cache lines.

In Example 8, the subject matter of any one of Examples 1-7 can optionally include that the copying of the first portion of the data is in response to receiving a request from at least one of a program or an operating system to copy the data from the source location to the destination location.

In Example 9, the subject matter of any one of Examples 1-8 can optionally include that the request specifies the source location and the destination location as logical addresses.

Example 10 is an apparatus to perform a memory copy operation. The apparatus of Example 10 includes a data store analyzer to determine a cache miss measure indicative of an amount of a first portion of data that is located in a cache, the cache miss measure based on copying the first portion of the data from a source location to a destination location, the first portion of the data being less than all of the data intended to be copied from the source location to the destination location; a copy type selector to select a type of memory copy operation based on the cache miss measure; and a copy initiator to initiate the memory copy operation based on the selected type of memory copy operation to copy a second portion of the data from the source location to the destination location.

In Example 11, the subject matter of Example 10 can optionally include that the cache miss measure is a cache miss rate, and that the copy type selector is to select the type of memory copy operation by: when the cache miss rate is less than a threshold, selecting a cache-based type of memory operation; and when the cache miss rate is greater than the threshold, selecting a non-cache-based type of memory operation.

In Example 12, the subject matter of any one of Examples 10-11 can optionally include that, when the cache miss rate is greater than the threshold, the non-cache-based type of memory copy operation is a memory-to-memory copy operation to bypass copying the data into the cache as an intermediate write location when copying the data from the source location to the destination location.

In Example 13, the subject matter of any one of Examples 10-12 can optionally include that when the cache miss rate is less than the threshold, the cache-based type of memory copy operation is at least one of a cache-to-memory copy operation or a cache-to-cache copy operation.

In Example 14, the subject matter of any one of Examples 10-13 can optionally include that the data store analyzer is to generate the cache miss measure based on copying the first portion of the data in combination with executing a Read Performance Monitoring Counter instruction.

In Example 15, the subject matter of any one of Examples 10-14 can optionally include the data includes a plurality of memory pages, the first portion of the data being less than all of the plurality of memory pages.

In Example 16, the subject matter of any one of Examples 10-15 can optionally include the data includes a plurality of cache lines, the first portion of the data being less than all of the plurality of cache lines.

In Example 17, the subject matter of any one of Examples 10-16 can optionally include that the copying of the first portion of the data is to be performed by the copy initiator in response to receiving a request from at least one of a program or an operating system to copy the data from the source location to the destination location.

In Example 18, the subject matter of any one of Examples 10-17 can optionally include that the request specifies the source location and the destination location as logical addresses.

Example 19 is at least one article of manufacture including machine readable instructions that, when executed, cause a processor to at least copy a first portion of data from a source location to a destination location, the first portion of the data being less than all of the data intended to be copied from the source location to the destination location; determine a cache miss measure indicative of an amount of the first portion of the data that is located in a cache; select a type of memory copy operation based on the cache miss measure; and initiate a memory copy operation based on the selected type of memory copy operation to copy a second portion of the data from the source location to the destination location.

In Example 20, the subject matter of Example 19 can optionally include that the cache miss measure is a cache miss rate, the instructions further to cause the processor to select type of memory copy operation by: when the cache miss rate is less than a threshold, selecting a cache-based type of memory operation; and when the cache miss rate is greater than the threshold, selecting a non-cache-based type of memory operation.

In Example 21, the subject matter of any one of Examples 19-20 can optionally include that, when the cache miss rate is greater than the threshold, the non-cache-based type of memory copy operation is a memory-to-memory copy operation to bypass copying the data into the cache as an intermediate write location when copying the data from the source location to the destination location.

In Example 22, the subject matter of any one of Examples 19-21 can optionally include that, when the cache miss rate is less than the threshold, the cache-based type of memory copy operation is at least one of a cache-to-memory copy operation or a cache-to-cache copy operation.

In Example 23, the subject matter of any one of Examples 19-22 can optionally include that, the instructions are to further cause the processor to generate the cache miss measure by copying the first portion of the data in combination with executing a Read Performance Monitoring Counter instruction.

In Example 24, the subject matter of any one of Examples 19-23 can optionally include that the data includes a plurality of memory pages, the first portion of the data being less than all of the plurality of memory pages.

In Example 25, the subject matter of any one of Examples 19-24 can optionally include that the data includes a plurality of cache lines, the first portion of the data being less than all of the plurality of cache lines.

In Example 26, the subject matter of any one of Examples 19-25 can optionally include that the instructions are to cause the processor to copy the first portion of the data in response to receiving a request from at least one of a program or an operating system to copy the data from the source location to the destination location.

In Example 27, the subject matter of any one of Examples 19-26 can optionally include that the request specifies the source location and the destination location as logical addresses.

Example 28 is an apparatus to perform a memory copy operation. The apparatus of Example 28 includes: means for determining a cache miss measure indicative of an amount of a first portion of data that is located in a cache, the cache miss measure based on copying the first portion of the data from a source location to a destination location, the first portion of the data being less than all of the data intended to be copied from the source location to the destination location; means for selecting a type of memory copy operation based on the cache miss measure; and means for initiating the memory copy operation based on the selected type of memory copy operation to copy a second portion of the data from the source location to the destination location.

In Example 29, the subject matter of Example 28 can optionally include that the cache miss measure is a cache miss rate, the means for selecting the type of memory copy operation is to select the type of memory copy operation by: when the cache miss rate is less than a threshold, selecting a cache-based type of memory operation; and when the cache miss rate is greater than the threshold, selecting a non-cache-based type of memory operation.

In Example 30, the subject matter of any one of Examples 28-29 can optionally include that, when the cache miss rate is greater than the threshold, the non-cache-based type of memory copy operation is a memory-to-memory copy operation to bypass copying the data into the cache as an intermediate write location when copying the data from the source location to the destination location.

In Example 31, the subject matter of any one of Examples 28-30 can optionally include that, when the cache miss rate is less than the threshold, the cache-based type of memory copy operation is at least one of a cache-to-memory copy operation or a cache-to-cache copy operation.

In Example 32, the subject matter of any one of Examples 28-31 can optionally include that the means for determining the cache miss measure is to generate the cache miss measure based on copying the first portion of the data in combination with executing a Read Performance Monitoring Counter instruction.

In Example 33, the subject matter of any one of Examples 28-32 can optionally include that the data includes a plurality of memory pages, the first portion of the data being less than all of the plurality of memory pages.

In Example 34, the subject matter of any one of Examples 28-33 can optionally include that the data includes a plurality of cache lines, the first portion of the data being less than all of the plurality of cache lines.

In Example 35, the subject matter of any one of Examples 28-34 can optionally include that the copying of the first portion of the data is to be performed by the means for initiating the memory copy operation in response to receiving a request from at least one of a program or an operating system to copy the data from the source location to the destination location.

In Example 36, the subject matter of any one of Examples 28-35 can optionally include that the request specifies the source location and the destination location as logical addresses.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

This is a U.S. National Stage Patent Application under 35 U.S.C. 371 of PCT Patent Application No. PCT/IB2016/001977, filed Dec. 20, 2016, and entitled "Methods and Apparatus to Perform Memory Copy Operations." PCT Patent Application No. PCT/IB2016/001977 is hereby incorporated herein by reference in its entirety.

What is claimed is:

1. A method to perform a memory copy operation, the method comprising:
    copying a first portion of data from a source location to a destination location, the first portion of the data being less than all of the data intended to be copied from the source location to the destination location;
    determining a cache miss rate associated with an amount of the first portion of the data that is located in a cache;
    selecting a type of memory copy operation based on the cache miss rate by:
        when the cache miss rate is less than a threshold, selecting a cache-based type of memory operation; and
        when the cache miss rate is greater than the threshold, selecting a non-cache-based type of memory operation; and
    initiating the memory copy operation based on the selected type of memory copy operation to copy a second portion of the data from the source location to the destination location.

2. The method of claim 1, wherein when the cache miss rate is greater than the threshold, the non-cache-based type of memory copy operation is a memory-to-memory copy operation to bypass copying the data into the cache as an intermediate write location when copying the data from the source location to the destination location.

3. The method of claim 1, wherein when the cache miss rate is less than the threshold, the cache-based type of memory operation is at least one of a cache-to-memory copy operation or a cache-to-cache copy operation.

4. The method of claim 1, wherein the copying of the first portion of the data is in response to receiving a request from at least one of a program or an operating system to copy the data from the source location to the destination location.

5. An apparatus to perform a memory copy operation, the apparatus comprising:
    a data store analyzer to determine a cache miss rate associated with an amount of a first portion of data that is located in a cache, the cache miss rate based on copying the first portion of the data from a source location to a destination location, the first portion of the data being less than all of the data intended to be copied from the source location to the destination location;
    a copy type selector to select a type of memory copy operation based on the cache miss rate by:

when the cache miss rate is less than a threshold, selecting a cache-based type of memory operation; and when the cache miss rate is greater than the threshold, selecting a non-cache-based type of memory operation; and a copy initiator to initiate the memory copy operation based on the selected type of memory copy operation to copy a second portion of the data from the source location to the destination location.

6. The apparatus of claim 5, wherein when the cache miss rate is greater than the threshold, the non-cache-based type of memory operation is a memory-to-memory copy operation to bypass copying the data into the cache as an intermediate write location when copying the data from the source location to the destination location.

7. The apparatus of claim 5, wherein when the cache miss rate is less than the threshold, the cache-based type of memory operation is at least one of a cache-to-memory copy operation or a cache-to-cache copy operation.

8. The apparatus of claim 5, wherein the data store analyzer is to determine the cache miss rate based on copying the first portion of the data in combination with executing a Read Performance Monitoring Counter instruction.

9. The apparatus of claim 5, wherein the data includes a plurality of memory pages, the first portion of the data being less than all of the plurality of memory pages.

10. The apparatus of claim 5, wherein the data includes a plurality of cache lines, the first portion of the data being less than all of the plurality of cache lines.

11. The apparatus of claim 5, wherein the copying of the first portion of the data is to be performed by the copy initiator in response to receiving a request from at least one of a program or an operating system to copy the data from the source location to the destination location.

12. The apparatus of claim 11, wherein the request specifies is to specify the source location and the destination location as logical addresses.

13. An apparatus to perform a memory copy operation, the apparatus comprising:
  means for determining a cache miss rate associated with an amount of a first portion of data that is located in a cache, the cache miss rate based on copying the first portion of the data from a source location to a destination location, the first portion of the data being less than all of the data intended to be copied from the source location to the destination location;
  means for selecting a type of memory copy operation based on the cache miss rate by:
    when the cache miss rate is less than a threshold, selecting a cache-based type of memory operation;
    when the cache miss rate is greater than the threshold, selecting a non-cache-based type of memory operation; and
  means for initiating the memory copy operation based on the selected type of memory copy operation to copy a second portion of the data from the source location to the destination location.

14. The apparatus of claim 13, wherein when the cache miss rate is greater than the threshold, the non-cache-based type of memory operation is a memory-to-memory copy operation to bypass copying the data into the cache as an intermediate write location when copying the data from the source location to the destination location.

15. The apparatus of claim 13, wherein when the cache miss rate is less than the threshold, the cache-based type of memory operation is at least one of a cache-to-memory copy operation or a cache-to-cache copy operation.

16. The apparatus of claim 13, wherein the data includes a plurality of memory pages, the first portion of the data being less than all of the plurality of memory pages.

17. The apparatus of claim 13, wherein the data includes a plurality of cache lines, the first portion of the data being less than all of the plurality of cache lines.

18. The apparatus of claim 13, wherein the copying of the first portion of the data is to be performed by the means for initiating the memory copy operation in response to receiving a request from at least one of a program or an operating system to copy the data from the source location to the destination location.

19. At least one non-transitory computer readable medium comprising machine readable instructions that, when executed, cause a processor to at least:
  copy a first portion of data from a source location to a destination location, the first portion of the data being less than all of the data intended to be copied from the source location to the destination location;
  determine a cache miss rate associated with an amount of the first portion of the data that is located in a cache;
  select a type of memory copy operation based on the cache miss rate by:
    when the cache miss rate is less than a threshold, selecting a cache-based type of memory operation; and
    when the cache miss rate is greater than the threshold, selecting a non-cache-based type of memory operation; and
  initiate a memory copy operation based on the selected type of memory copy operation to copy a second portion of the data from the source location to the destination location.

20. The at least one non-transitory computer readable medium of claim 19, wherein when the cache miss rate is greater than the threshold, the non-cache-based type of memory copy operation is a memory-to-memory copy operation to bypass copying the data into the cache as an intermediate write location when copying the data from the source location to the destination location.

21. The at least non-transitory computer readable medium of claim 19, wherein when the cache miss rate is less than the threshold, the cache-based type of memory operation is at least one of a cache-to-memory copy operation or a cache-to-cache copy operation.

22. The at least non-transitory computer readable medium of claim 19, wherein the instructions are to cause the processor to determine the cache miss rate by copying the first portion of the data in combination with executing a Read Performance Monitoring Counter instruction.

23. The at least non-transitory computer readable medium of claim 19, wherein the data includes a plurality of memory pages, the first portion of the data being less than all of the plurality of memory pages.

24. The at least non-transitory computer readable medium of claim 19, wherein the data includes a plurality of cache lines, the first portion of the data being less than all of the plurality of cache lines.

25. The at least non-transitory computer readable medium of claim 19, wherein the instructions are to cause the processor to copy the first portion of the data in response to receiving a request from at least one of a program or an operating system to copy the data from the source location to the destination location.

* * * * *

UNITED STATES PATENT AND TRADEMARK OFFICE
CERTIFICATE OF CORRECTION

| | | |
|---|---|---|
| PATENT NO. | : 11,016,695 B2 | |
| APPLICATION NO. | : 16/345640 | |
| DATED | : May 25, 2021 | |
| INVENTOR(S) | : Durnov et al. | |

It is certified that error appears in the above-identified patent and that said Letters Patent is hereby corrected as shown below:

In the Claims

In Column 23, Line 37, delete "specifies"

Signed and Sealed this
Twenty-eighth Day of June, 2022

Katherine Kelly Vidal
*Director of the United States Patent and Trademark Office*